(12) United States Patent
El-Siblani

(10) Patent No.: US 10,245,822 B2
(45) Date of Patent: Apr. 2, 2019

(54) METHOD AND APPARATUS FOR CONCURRENTLY MAKING MULTIPLE THREE-DIMENSIONAL OBJECTS FROM MULTIPLE SOLIDIFIABLE MATERIALS

(71) Applicant: Global Filtration Systems, Dearborn Heights, MI (US)

(72) Inventor: Ali El-Siblani, Dearborn Heights, MI (US)

(73) Assignee: Global Filtration Systems, Dearborn Heights, MI (US)

( * ) Notice: Subject to any disclaimer, the term of this patent is extended or adjusted under 35 U.S.C. 154(b) by 399 days.

(21) Appl. No.: 14/966,098

(22) Filed: Dec. 11, 2015

(65) Prior Publication Data

US 2017/0165916 A1    Jun. 15, 2017

(51) Int. Cl.
*B33Y 50/02* (2015.01)
*B29C 64/124* (2017.01)
*B29C 64/182* (2017.01)
*B29C 64/336* (2017.01)
*B33Y 10/00* (2015.01)
(Continued)

(52) U.S. Cl.
CPC ............ *B33Y 50/02* (2014.12); *B29C 64/124* (2017.08); *B29C 64/182* (2017.08); *B29C 64/336* (2017.08); *B29C 64/40* (2017.08); *B29K 2995/0005* (2013.01); *B33Y 10/00* (2014.12); *B33Y 50/00* (2014.12)

(58) Field of Classification Search
CPC ... B29C 64/124; B29C 64/129; B29C 64/135; B29C 64/171; B29C 64/176; B29C 64/286; B29C 64/393; B29C 64/386; B29C 67/0088
See application file for complete search history.

(56) References Cited

U.S. PATENT DOCUMENTS 5,136,515 A    8/1992  Helinski
5,287,435 A    2/1994  Cohen et al.
(Continued)

FOREIGN PATENT DOCUMENTS

CN    101898423 A    12/2010
DE    G9319405.6 U1    5/1994
(Continued)

OTHER PUBLICATIONS

International Search Report and Written Opinion for PCT/US2016/065773, dated Feb. 17, 2017.
(Continued)

*Primary Examiner* — Peter L Vajda
(74) *Attorney, Agent, or Firm* — Hansen IP Law PLLC

(57) ABSTRACT

Methods and apparatuses for making multiple three-dimensional objects from multiple solidifiable materials are shown and described. In accordance with the method, the objects are designed with variable removable support heights along the build axis so that each object has an interface between first and second materials that is the same height from the build platform. The technique simplifies the process of producing multiple three-dimensional objects from multiple solidifiable materials which may have different build axis heights of first and second finished object sections so that the sources of solidifiable materials need only be switched once during the building of multiple objects.

14 Claims, 8 Drawing Sheets

(51) Int. Cl.
*B33Y 50/00* (2015.01)
*B29C 64/40* (2017.01)

(56) References Cited

U.S. PATENT DOCUMENTS

| | | | |
|---|---|---|---|
| 5,386,500 | A | 1/1995 | Pomerantz et al. |
| 5,447,822 | A | 9/1995 | Hull et al. |
| 5,519,816 | A | 5/1996 | Pomerantz et al. |
| 5,876,550 | A | 3/1999 | Feygin et al. |
| 6,136,252 | A | 10/2000 | Bedal et al. |
| 6,259,962 | B1 | 7/2001 | Gothait |
| 6,532,394 | B1 | 3/2003 | Earl et al. |
| 6,658,314 | B1 | 12/2003 | Gothait |
| 6,660,209 | B2 | 12/2003 | Leyden et al. |
| 6,936,212 | B1 | 8/2005 | Crawford |
| 7,183,335 | B2 | 2/2007 | Napadensky |
| 7,225,045 | B2 | 5/2007 | Gothait et al. |
| 7,209,797 | B2 | 8/2007 | Kritchman et al. |
| 7,364,686 | B2 | 4/2008 | Kritchman et al. |
| 7,368,484 | B2 | 5/2008 | Levy |
| 7,479,510 | B2 | 1/2009 | Napadensky et al. |
| D588,701 | S | 3/2009 | Sperry et al. |
| 7,500,846 | B2 | 3/2009 | Eshed et al. |
| 7,614,866 | B2 | 11/2009 | Sperry et al. |
| 7,628,857 | B2 | 12/2009 | Kritchman et al. |
| 7,685,694 | B2 | 3/2010 | Zagagi et al. |
| 7,958,841 | B2 | 6/2011 | Kritchman et al. |
| 8,106,107 | B2 | 1/2012 | Napadensky |
| 8,801,418 | B2 | 8/2014 | Ei-Siblani et al. |
| 2002/0008333 | A1 | 1/2002 | Napadensky et al. |
| 2002/0016386 | A1 | 2/2002 | Napadensky |
| 2002/0153640 | A1 | 10/2002 | John |
| 2003/0030398 | A1 | 2/2003 | Jacobs et al. |
| 2003/0151167 | A1 | 8/2003 | Kritchman et al. |
| 2003/0207959 | A1 | 11/2003 | Napadensky et al. |
| 2004/0118309 | A1 | 6/2004 | Fedor et al. |
| 2004/0187714 | A1 | 9/2004 | Napadensky et al. |
| 2005/0104241 | A1 | 5/2005 | Kritchman et al. |
| 2005/0192372 | A1 | 9/2005 | Napadensky et al. |
| 2005/0208168 | A1 | 9/2005 | Hickerson et al. |
| 2006/0054039 | A1 | 3/2006 | Kritchman et al. |
| 2006/0206227 | A1 | 9/2006 | Kritchman et al. |
| 2007/0168815 | A1 | 7/2007 | Napadensky et al. |
| 2007/0173967 | A1 | 7/2007 | Kritchman et al. |
| 2008/0042321 | A1 | 2/2008 | Russell et al. |
| 2008/0105818 | A1 | 5/2008 | Cohen |
| 2008/0110395 | A1 | 5/2008 | Kritchman et al. |
| 2008/0118655 | A1 | 5/2008 | Kritchman |
| 2008/0121130 | A1 | 5/2008 | Kritchman |
| 2008/0121172 | A1 | 5/2008 | Kritchman et al. |
| 2008/0124464 | A1 | 5/2008 | Kritchman et al. |
| 2008/0124475 | A1 | 5/2008 | Kritchman |
| 2008/0166480 | A1 | 7/2008 | Kritchman et al. |
| 2008/0179786 | A1 | 7/2008 | Sperry et al. |
| 2008/0217818 | A1 | 9/2008 | Holmboe et al. |
| 2008/0269939 | A1 | 10/2008 | Kritchman |
| 2009/0105363 | A1 | 4/2009 | Napadensky |
| 2009/0145357 | A1 | 6/2009 | Kritchman et al. |
| 2009/0179355 | A1 | 7/2009 | Wicker et al. |
| 2009/0196946 | A1 | 8/2009 | Kihara et al. |
| 2009/0210084 | A1 | 8/2009 | Eshbed et al. |
| 2009/0304952 | A1 | 12/2009 | Kritchman |
| 2010/0140850 | A1 | 6/2010 | Napadensky |
| 2010/0140852 | A1 | 6/2010 | Kritchman et al. |
| 2010/0170540 | A1 | 7/2010 | Kritchman et al. |
| 2010/0191360 | A1 | 7/2010 | Napadensky et al. |
| 2010/0195122 | A1 | 8/2010 | Kritchman |
| 2011/0077321 | A1 | 3/2011 | Napadensky |
| 2011/0180952 | A1 | 7/2011 | Napadensky |
| 2011/0241240 | A1 | 10/2011 | Gothait et al. |
| 2011/0260365 | A1 | 10/2011 | El-Siblani |
| 2011/0309554 | A1 | 12/2011 | Liska et al. |
| 2011/0310370 | A1 | 12/2011 | Rohner et al. |
| 2013/0001834 | A1* | 1/2013 | El-Siblani ........... B29C 67/0062 264/401 |
| 2014/0227382 | A1* | 8/2014 | Liska ................. A61C 13/0013 425/112 |
| 2014/0319735 | A1 | 10/2014 | El-Siblani et al. |
| 2014/0322374 | A1 | 10/2014 | El-Siblani et al. |
| 2015/0072293 | A1* | 3/2015 | DeSimone ........... B29C 67/007 430/322 |
| 2015/0165695 | A1 | 6/2015 | Chen et al. |
| 2015/0266240 | A1 | 9/2015 | Okamoto et al. |

FOREIGN PATENT DOCUMENTS

| | | |
|---|---|---|
| DE | 19929199 A1 | 1/2001 |
| DE | 10256672 A1 | 6/2004 |
| DE | 60123595 T2 | 8/2007 |
| EP | 1637307 A2 | 3/2006 |
| EP | 1674243 A2 | 6/2006 |
| EP | 1637307 A3 | 9/2006 |
| EP | 1274551 B1 | 10/2006 |
| EP | 1847377 A2 | 10/2007 |
| EP | 1876012 A1 | 1/2008 |
| EP | 1590149 B1 | 10/2008 |
| EP | 2199068 A2 | 6/2010 |
| EP | 2277686 A2 | 1/2011 |
| EP | 2298540 A2 | 3/2011 |
| EP | 2011631 B1 | 4/2012 |
| EP | 1741545 B1 | 7/2013 |
| GB | 2311960 A | 10/1997 |
| JP | 08150662 | 6/1996 |
| WO | 2008120183 A1 | 10/2008 |
| WO | 2009013751 A2 | 1/2009 |
| WO | 2009125381 A1 | 10/2009 |
| WO | 2010045950 A1 | 4/2010 |
| WO | 2010045951 A1 | 4/2010 |
| WO | 2012106256 A1 | 8/2012 |

OTHER PUBLICATIONS

Document 1-4 for Complaint Cover Sheet, *Objet Geometries, Ltd. v. 3D Systems, Inc.*, Case 0:5-cv-00136-JRT-FLN.
Complaint, *Objet Geometries, Ltd. v. 3D Systems, Inc.*, Case 0:5-cv-00136-JRT-FLN.
Document 1-1 for Complaint, *Objet Geometries, Ltd. v. 3D Systems, Inc.*, Case 0:5-cv-00136-JRT-FLN.
Document 1-2 for Complaint, *Objet Geometries, Ltd. v. 3D Systems, Inc.*, Case 0:5-cv-00136-JRT-FLN.
Document 1-3 for Complaint, *Objet Geometries, Ltd. v. 3D Systems, Inc.*, Case 0:5-cv-00136-JRT-FLN.
English translation of DE 9319405U1 from Lexis Nexis Total Patent.
International Search Report and Written Opinion dated May 21, 2012.
Opposition to EP 2 011 631 dated Jan. 14, 2013.
European Patent Office (EPO) Notice of Opposition dated Feb. 25, 2013.
Huang, et al., "Computer Supported Force Analysis and Layer Imagine for Masked Rapid Prototyping System" Department of Mechanical Engineering, National Taiwan University of Science and technology, Taipei, Taiwan.
Huang, et al., "On-line force monitoring of platform ascending rapid prototyping system" Journal of Materials Processing Technology 159 (2005) 257-264.
Patent Abstracts of Japan, English Translation of JP 08-150662, from http://www19.ipdl.inpit.gojp/PA1/resultmainwoYeaMaDA408150662P1.htm2011/07/15.
English translation of DE 10256672 from Lexis Nexis Total Patent.
English translation of DE 19929199 from Lexis Nexis Total Patent.
English translation of WO2010045950 from Lexis Nexis Total Patent.
English translation of DE60123595 from Lexis Nexis Total Patent.
English translation of CN 101898423 from Lexis Nexis Total Patent.

* cited by examiner

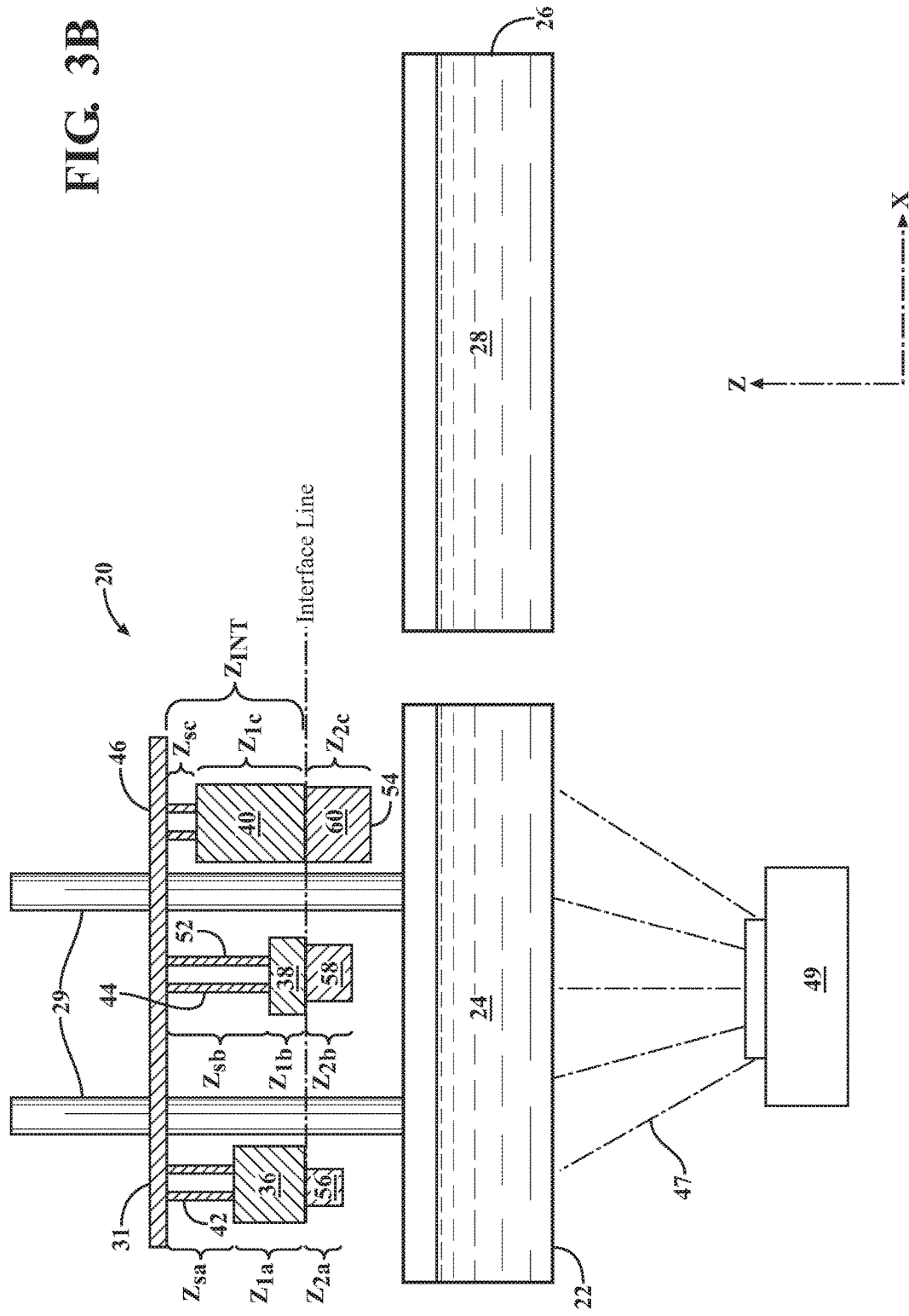

METHOD AND APPARATUS FOR CONCURRENTLY MAKING MULTIPLE THREE-DIMENSIONAL OBJECTS FROM MULTIPLE SOLIDIFIABLE MATERIALS

FIELD

The disclosure relates to a system and method for concurrently manufacturing three-dimensional objects from multiple solidifiable materials.

DESCRIPTION OF THE RELATED ART

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies including photo-polymer hardening using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, a pattern generator may be used to construct the part. An example of a pattern generator may include the use of DLP® (Digital Light Processing technology) from Texas Instruments®, SXRD™ (Silicon X-tal Reflective Display), LCD (Liquid Crystal Display), LED (Light Emitting Diode) Printheads, LCOS (Liquid Crystal on Silicon), DMD (digital mirror device), J-ILA from JVC, SLM (Spatial light modulator) or any type of selective light modulation system. Pattern generators may comprise linear solidification devices that project energy in a one-dimensional pattern or two-dimensional solidification devices that project the energy in two dimensions, as in the case of a two-dimensional array of mirrors used in a DLP®.

In certain three-dimensional object manufacturing processes, it is desirable to use multiple solidifiable materials. This typically requires the use of different containers, cartridges, or other sources of the solidifiable materials, and the materials are selectively placed in alignment with a build platform and source of solidification energy at different times to create the different object sections from different materials.

However, at the same time, it is often beneficial to concurrently manufacture multiple units of a three-dimensional object to maximize the use of a three-dimensional object manufacturing apparatus. If the objects are identical, this poses no problem. However, in certain cases, similar objects may differ as to the relative heights (along the build axis) of sections made from a particular material. This may require selectively bringing the sources of solidifiable material into alignment with the build platform and a solidification energy source, which prolongs object build times. Thus, a need has arisen for a method of concurrently making multiple three-dimensional objects from multiple materials which addresses the foregoing issues.

BRIEF DESCRIPTION OF THE DRAWINGS

The disclosure will now be described, by way of example, with reference to the accompanying drawings, in which:

FIG. 3B is a schematic view of the apparatus of FIG. 3A in a second configuration;

DETAILED DESCRIPTION

Figure 1A:
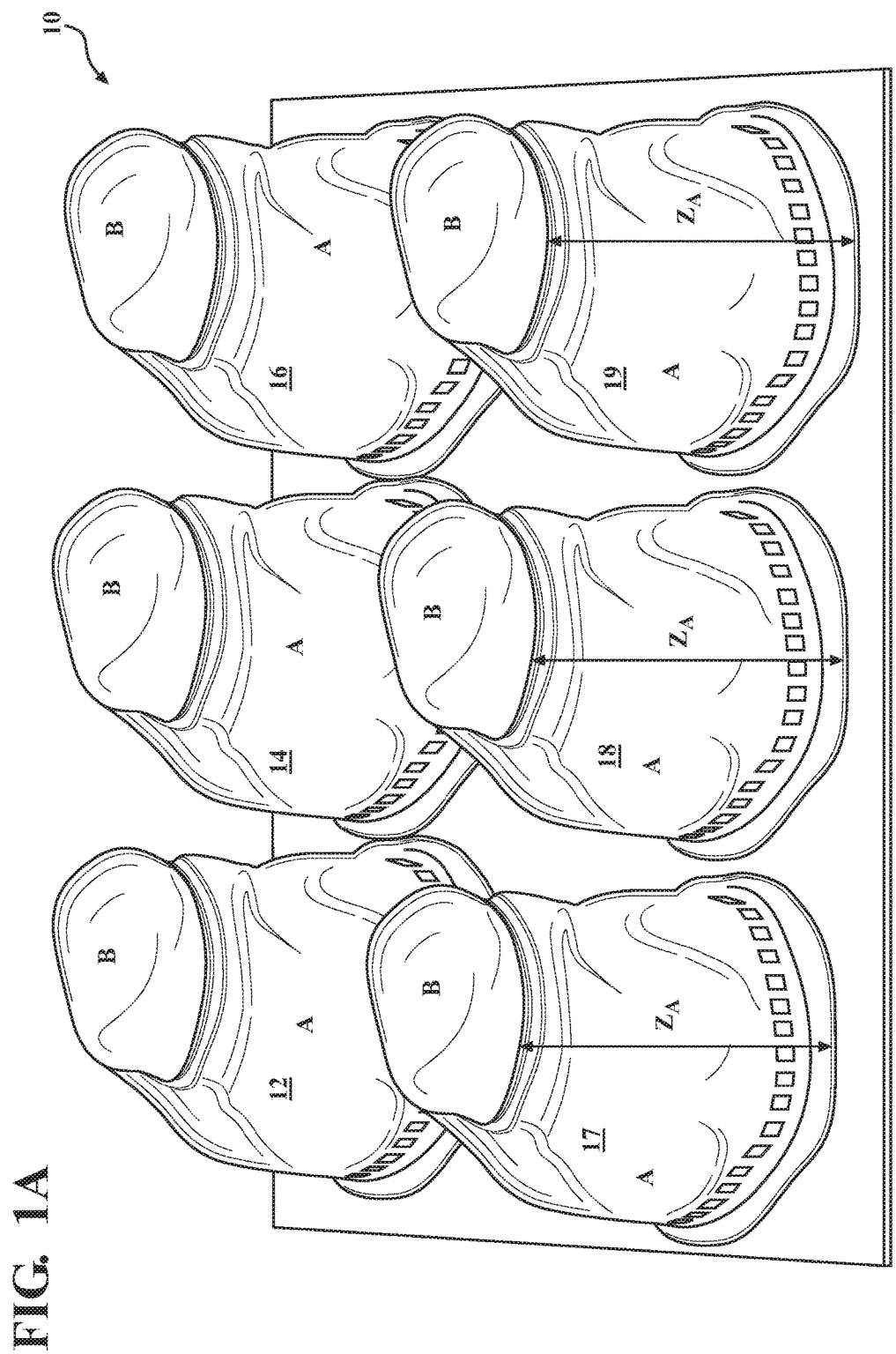
FIG. 1A is a perspective view of six (6) hearing aids concurrently built by solidifying multiple solidifiable materials.

The Figures illustrate examples of a system and method for manufacturing. Based on the foregoing, it is to be generally understood that the nomenclature used herein is simply for convenience and the terms used to describe the invention should be given the broadest meaning by one of ordinary skill in the art. Unless otherwise specified, like numerals refer to like components herein.

The system and methods described herein are generally applicable to additive manufacturing of three-dimensional objects, such as components or parts (discussed herein generally as objects), but may be used beyond that scope for alternative applications. The systems and methods are generally applicable to the concurrent manufacture of multiple objects by solidifying multiple solidifiable materials by subjecting them to patterns of solidification energy. As discussed herein, a solidifiable material is a material that when subjected to a sufficient energy density, wholly or partially hardens. This reaction to solidification or partial solidification may be used as the basis for constructing the three-dimensional object. Examples of a solidifiable material may include a polymerizable or cross-linkable material, a photopolymer, a photo powder, a photo paste, or a photosensitive composite that contains any kind of ceramic based powder such as aluminum oxide or zirconium oxide or ytteria stabilized zirconium oxide, a curable silicone composition, silica based nano-particles or nano-composites. The solidifiable material may further include fillers. Moreover, the solidifiable material my take on a final form (e.g., after exposure to the electromagnetic radiation) that may vary from semi-solids, solids, waxes, and crystalline solids.

When discussing a photopolymerizable, photocurable, or solidifiable material, any material is meant, possibly comprising a resin and optionally further components, which is solidifiable by means of supply of stimulating energy such as electromagnetic radiation. Suitably, a material that is polymerizable and/or cross-linkable (i.e., curable) by electromagnetic radiation (common wavelengths in use today include UV radiation and/or visible light) can be used as such material. In an example, a material comprising a resin formed from at least one ethylenically unsaturated compound (including but not limited to (meth)acrylate monomers and polymers) and/or at least one epoxy group-containing compound may be used. Suitable other components of the solidifiable material include, for example, inorganic and/or organic fillers, coloring substances, viscose-controlling agents, etc., but are not limited thereto.

When photopolymers are used as the solidifiable material, a photoinitiator is typically provided. The photoinitiator absorbs light and generates free radicals which start the polymerization and/or crosslinking process. Photoinitiators will have an absorption spectrum based on their concentration in the photopolymer. That spectrum corresponds to the wavelengths that must be absorbed by the photoinitiator to initiate solidification.

Suitable types of photoinitiators include metallocenes, 1,2 di-ketones, acylphosphine oxides, benzyldimethyl-ketals, α-amino ketones, and α-hydroxy ketones. Examples of suitable metallocenes include Bis (eta 5-2, 4-cyclopenadien-1-yl) Bis [2,6-difluoro-3-(1H-pyrrol-1-yl) phenyl] titanium, such as Irgacure 784, which is supplied by Ciba Specialty chemicals. Examples of suitable 1,2 di-ketones include quinones such as camphorquinone. Examples of suitable acylphosphine oxides include bis acyl phosphine oxide (BAPO), which is supplied under the name Irgacure 819, and mono acyl phosphine oxide (MAPO) which is supplied under the name Darocur® TPO. Both Irgacure 819 and Darocur® TPO are supplied by Ciba Specialty Chemicals. Examples of suitable benzyldimethyl ketals include alpha, alpha-dimethoxy-alpha-phenylacetophenone, which is supplied under the name Irgacure 651. Suitable α-amino ketones include 2-benzyl-2-(dimethylamino)-1-[4-(4-morpholinyl) phenyl]-1-butanone, which is supplied under the name Irgacure 369. Suitable α-hydroxy ketones include 1-hydroxy-cyclohexyl-phenyl-ketone, which is supplied under the name Irgacure 184 and a 50-50 (by weight) mixture of 1-hydroxy-cyclohexyl-phenyl-ketone and benzophenone, which is supplied under the name Irgacure 500.

An example of a set 10 of such objects is provided in FIG. 1A. The set 10 comprises six (6) hearing aids 12, 14, 16, 17, 18, and 19 and is prepared by solidifying first and second solidifiable materials. The first solidifiable material is solidified to form the first object section A of each hearing aid 12, 14, 16, 17, 18, and 19, and the second solidifiable material is solidified to form the second object section B of each hearing aid 12, 14, 16, 17, 18, and 19. In certain examples, the first section A is relatively harder than the second section B. Each hearing aid 12, 14, 16, 17, 18, and 19 has an interface between the first section A and the second section B. If the build axis heights of the first section A are different as between the various hearing aids 12, 14, 16, 17, 18, and 19 (i.e., if the values of $Z_A$ differ as between the hearing aids), the source of solidifiable materials will have to be repeatedly switched as each layer is built. This is best illustrated with reference to FIG. 1B.

Figure 1B:
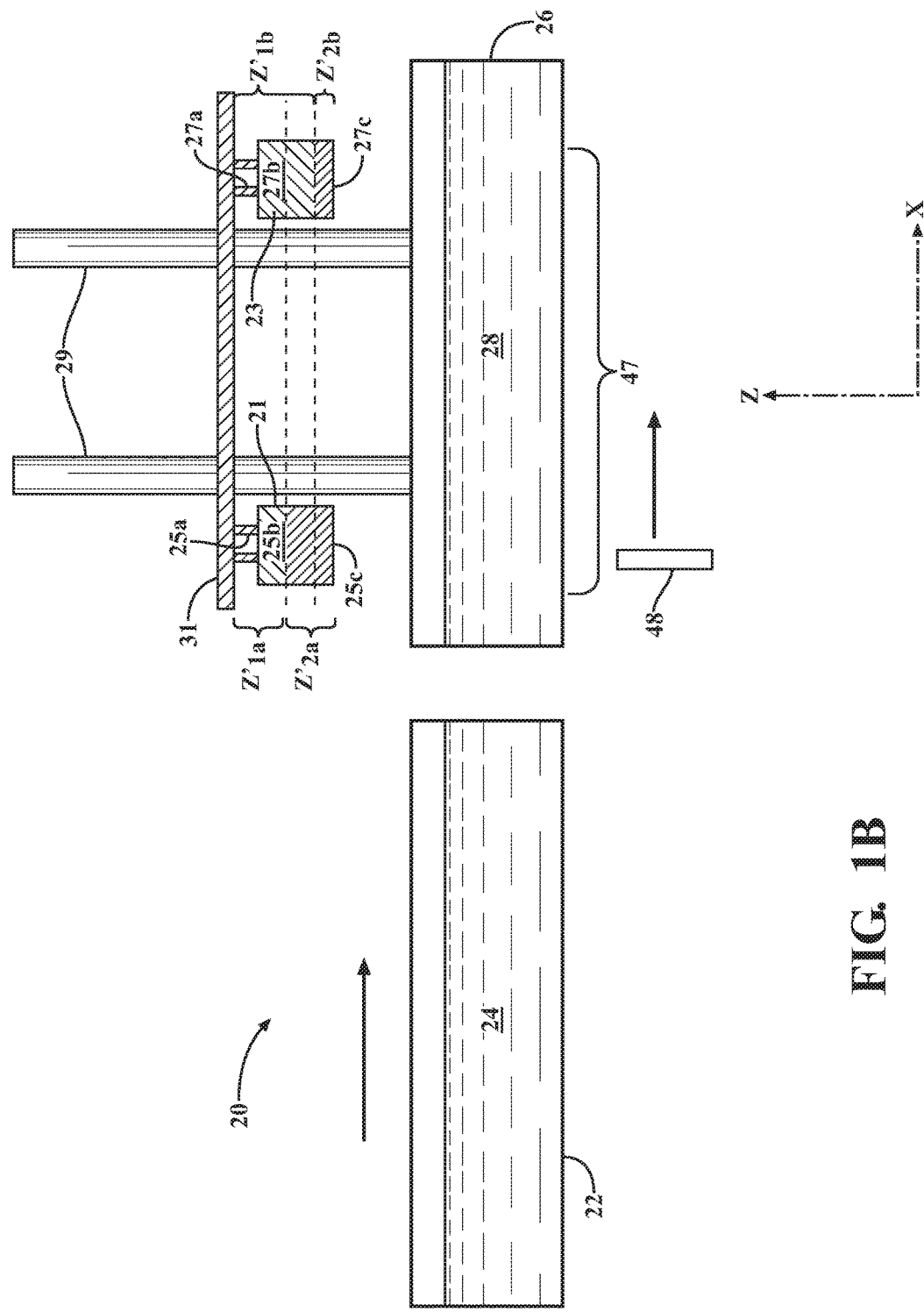
FIG. 1B is a schematic view of an apparatus for making multiple three-dimensional objects from multiple materials without using a common first object material interface distance.

FIG. 1B shows a system 20 for concurrently making multiple three-dimensional objects 21 and 23 from multiple solidifiable materials 28 and 24. First solidifiable object material 28 is provided in a container 26. Second solidifiable object material 24 is provided in a container 22. Two three-dimensional objects 21 and 23 are built on build platform 31. Build platform 31 is a generally rigid and planar surface upon which objects 21 and 23 are progressively built during an object build process. As indicated in FIG. 1B, build platform 31 is moveable along the build (z) axis during an object build process. Build platform 31 is movable via elevator 29 along the build (z) axis. In FIG. 1B the objects 21 and 23 are shown following the completion of an object build process. However, in general, the objects 21 and 23 are built by solidifying layers of solidifiable material 28 or 24 to progressively build each object 21 and 23 along the build (z) axis. As an object is built, its exposed (downward-facing) surface is spaced apart from the bottom of one of the containers 22 or 26 by one layer thickness of the corresponding solidifiable material 24 or 28 and selectively subjected to solidification energy from a solidification energy device that provides patterns of solidification energy that correspond to a desired pattern of solidification. In FIG. 1B, the solidification energy device is a linear solidification device 48 which scans linear patterns of solidification energy along a scanning (y) axis (not shown but projects into the page in FIG. 1B) as the linear solidification device 48 moves along a travel (x) axis. Examples of such linear solidification devices are provided in U.S. Pat. No. 9,079,355, the entirety of which is hereby incorporated by reference. In particular, FIGS. 5A-5D of U.S. Pat. No. 9,079,355 illustrate examples of linear solidification devices. In FIG. 1B, solidifiable material container 26 is positioned in solidification region 47 to receive solidification energy from linear solidification device 48. As used herein, the term "solidification region" refers to an area orthogonal to the build (z) axis in which projected energy from linear solidification device 48 may contact the exposed surface of a solidifiable material. When a two-dimensional pattern generator 49 such as a DLP® is used (FIGS. 3A and 3B), the solidification region 47 will be the area of the exposed surface of the solidifiable material which receives electromagnetic energy when all the DLP® mirrors are activated. In any given step of a solidification process, it may be the case that not all areas lying within the solidification region 47 will receive solidification energy because some of the mirrors may be off or set such that they do not project sufficient energy to cause solidification. With respect to linear solidification device 48, the maximum area over which solidification energy may be provided (i.e., the extent of the solidification area that corresponds to the full traversal and scanning area of the linear solidification device 48) will be the solidification region 47.

As shown in FIGS. 5A-5D of U.S. Pat. No. 9,079,355, the linear solidification device 48 includes a solidification energy source, such as a laser diode, that may be toggled on and off as a rotating polygonal mirror rotates in the x-y plane. As solidification energy traverses the length of each facet of the rotating polygonal mirror, it forms a scan line along an exposed surface of the solidifiable material 28 (i.e., the bottom-facing surface of the solidifiable material 28 in contact with the transparent and/or translucent bottom of container 26). A laser diode modulator toggles the energy state of the laser diode (ON or OFF) based on image data representing the desired three-dimensional objects 21 and 23. In certain preferred examples, the image data is in the form of data strings that comprise a number of time values, each of which defines a time at which the energization state of the solidification energy source changes (i.e., from ON to OFF or vice-versa). Exemplary data strings are shown in FIGS. 16(d), 16(f), and 16(g) of U.S. Pat. No. 9,079,355.

The objects 21 and 23 in FIG. 1B comprise both first object material 28 and second object material 24. In order to solidify sections comprising different materials, the solidifiable material containers 22 and 26 must be selectively brought in and out of alignment with build platform 31 so that the exposed surface of the objects 21 and 23 may contact the desired solidifiable material 28 or 24, which is then exposed to solidification energy and solidified. In FIG.

1B solidifiable material container 26 is aligned with build platform 31. In other words, the area of the build platform 31 on which objects 21 and 23 may be built (an area called the "build envelope") overlaps, and preferably lies within, the x-y area of the solidifiable material container 26 when the build platform is viewed from above along the build (z) axis. A carriage assembly (not shown) is provided to move the containers 22 and 26 along the travel (x) axis into and out of alignment with build platform 31. In other examples, the containers 22 and 26 may remain stationary and the build platform assembly comprising the build platform elevator 29 and the build platform 31 may move along the travel (x) axis into selective alignment with one or the other of solidifiable material containers 22 and 26. In both cases, the build platform 31 and the solidifiable material containers 22 and 26 move relative to one another. In FIG. 1B, container 22 is not aligned with build platform 31.

In FIG. 1B first object 21 has a removable support section 25a, a first object section 25b, and a second object section 25c. First object 21 is shown at the end of the solidification process prior to removing object 21 from build platform 31. Second object 23 has a removable support section 27a a first object section 27b, and a second object section 27c and is also shown at the end of the object solidification process.

The removable supports in removable support section 25a are dimensioned so that they can be easily separated from the first object section 25b to yield the finished object. The removable supports in support section 27a are similarly dimensioned sot that they can be easily separated from the first object section 27b to yield the finished object.

The removable support section 25a and first object section 25b are made by solidifying a first solidifiable material 28 provided in first solidifiable material container 26. Container 26 preferably includes a rigid or semi-rigid bottom that is transparent and/or translucent. Linear solidification device 48 travels along a travel (x) axis and scans solidification energy up through the transparent and/or translucent bottom of first solidifiable material container 26 in a series of linear patterns comprising scan lines having lengths along the (y) axis. The scan lines correspond to the support section 25a and the first object section 25b. Different regions (in the x-y plane) of successive layers of first solidifiable object material 28 are solidified in patterns defined by a set of data strings to form each layer of objects 21 and 23. Thus, each build (z) axis position (relative to build platform 31) of each partially-completed object 30, 32, and 34 is defined by a set of data strings. Each data string defines a scan line (which may be continuous or discontinuous) along the scanning (y) axis. The data strings define times at which a solidification energy source (e.g., a laser diode) in the linear solidification device 48 is toggled on and off as the rotating polygonal mirror contained in the linear solidification device 48 rotates in the y-z plane. Examples of data strings are shown in FIGS. 16(d), 16(f), and 16(g) of U.S. Pat. No. 9,079,355.

First object 21 has an interface distance along the build (z) axis relative to build platform that is $z'_{1a}$. The interface is where the first object section 25b (formed from first solidifiable object material 28) and second object section 25c (formed from second solidifiable object material 24) meet. Second object 23 has an interface distance along the build (z) axis that is $z'_{1b}$. However, $z'_{1b}$ is greater than $z'_{1a}$. As a result, when the objects 21 and 23 are at a point in the object build process at which their exposed (downward-facing) surfaces are between the dashed lines, their corresponding layers are formed from different ones of the first solidifiable object material 28 and second solidifiable object material 24. In the region between the dashed lines, first object 21 is formed from second solidifiable object material 24 and second object 23 is formed from first object material 28. In order to form object layers that are located at the same build (z) axis position (relative to build platform 31) from different materials 28, 24, one object layer for one object 21, 23 must be formed from one of the materials 28, 24 and then the containers 22 and 26 and/or build platform 31 must be moved so that the other object's 21, 23 layer can be formed from another of the first and second solidifiable object materials 28 and 24. Thus, for example, when the region between the dashed lines in FIG. 1B is being built, object 21 must be lowered in container 22 so that its exposed (downward-facing) surface is spaced apart from the bottom of container 22 by one layer thickness. That layer thickness is then solidified by linear solidification device 48 (or another one if each container 22 and 26 has its own device). Then, the elevator 29 raises the build platform 31 out of the container 22, after which the first container 26 and build platform 31 move relative to one another along the travel (x) axis to align the build platform 31 with the first container 26. The elevator 29 then descends until the exposed surface of second object 23 is one layer thickness from the bottom of container 26, and the layer of material 28 is solidified in a desired pattern to form the next layer of object 23. Thus, each layer built between the dashed lines of FIG. 1B requires moving and aligning the containers 22 and 26 with build platform 31. In the region above the upper dashed line (i.e., toward build platform 31), both objects 21 and 23 are made from first solidifiable object material 28. Thus, the build platform 31 may remain aligned with first solidifiable object material container 26 until the upper dashed line is reached. In the region below the lower dashed line, each object 21 and 23 is made from second solidifiable object material 24. Thus, the build platform 31 may remain aligned with the second solidifiable object material container 22.

The repeated switching of the solidifiable material containers 22 and 26 in the region between the dashed lines is necessary because each object's interface between the solidified first solidifiable object material 28 and solidified second solidifiable object material 24 is at a different build axis height (i.e., $Z'_{1a} \neq Z'_{1b}$) relative to build platform 31. It has been discovered that by adjusting the removable support section 25a and 27a heights along the build (z) axis, the interface positions $Z'_{1a}$ and $Z'_{1b}$ may be made equal to one another, which only requires one material container switching operation.

Figure 2A:
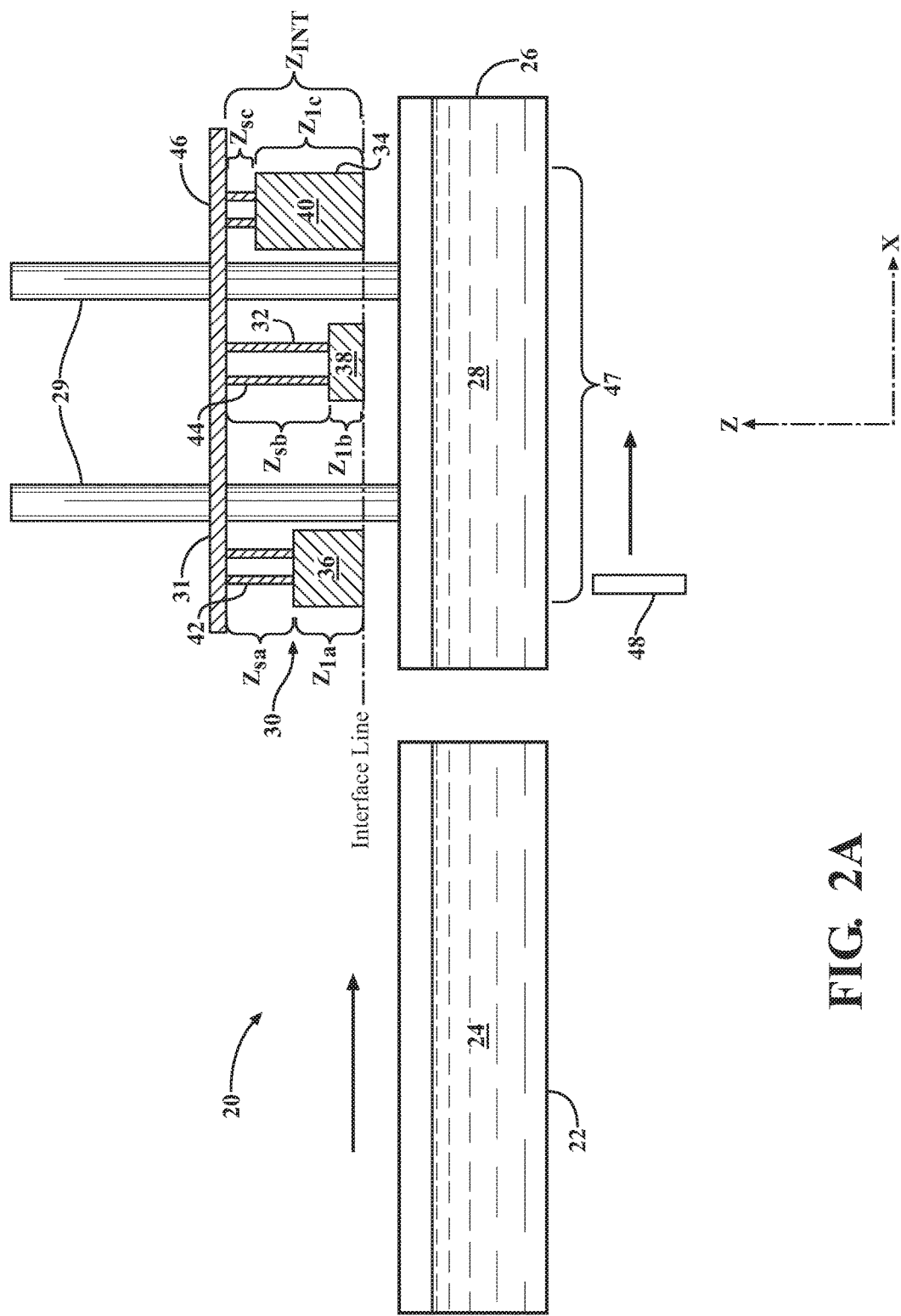
FIG. 2A is a schematic view of a first apparatus for concurrently making multiple three-dimensional objects in a first configuration in accordance with the present disclosure.

Referring to FIG. 2A, objects designed in accordance with present disclosure are depicted in use with system 20. The system 20 is the same as the system 20 of FIG. 1B. However, the objects are designed to reduce the number of solidifiable material switching events. Partially-completed objects 30, 32, and 34 are shown following the solidification of the removable support sections 42, 44, and 36, and first object sections 36, 38, and 40. As shown in the figure, each of the partially-completed objects 30, 32, and 34 has first object sections 36, 38, and 40 with different build axis heights, $Z_{1a}$, $Z_{1b}$, and $Z_{1c}$, respectively. However, each partially-completed object 30, 33, and 34 has the same interface distance $Z_{INT}$ along the build (z) axis relative to the build platform 31. The equalization of the interface distances is achieved by adjusting the build (z) axis heights $Z_{Sa}$, $Z_{Sb}$, and $Z_{Sc}$ of each partially-completed object's removable support section 42, 44, and 46 such that the sum of the support heights and the first object section heights is the same for each partially-completed object 30, 32, and 34. In other words, the following is true:

$$Z_{sa}+Z_{1a}=Z_{sb}+Z_{1b}=Z_{sc}+Z_{1c}=Z_{INT} \quad (1)$$

Because the interface distances of each partially completed object 30, 32, 34, are the same, the build platform 31 remains in alignment with the first solidifiable object material container 26 during the entire time each of three partially-completed objects 30, 32, and 34 are concurrently built until the interface between the first and second solidifiable object material is reached. Different regions (in the x-y plane) of successive layers of first solidifiable object material 28 are solidified in patterns defined by a set of data strings to form each layer of the removable object support sections 42, 44, and 46 and the first object sections 36, 38, and 40 of partially-completed object 30, 32, and 34. Thus, each build (z) axis position (relative to build platform 31) of each partially-completed object 30, 32, and 34 is defined by a set of data strings. Each data string defines a scan line (which may be continuous or discontinuous) along the scanning (y) axis. The portions of each partially-completed object 30, 32, 34 at a given build (z) axis height from the build platform 31 will be solidified in the same layer solidification operation. In a given layer of first solidifiable object material 28, the first object section 36, 38, 40 of some objects may be solidified while the support section, 42, 44, and 46 of other objects may be solidified. For example, once height $Z_{sc}$ is reached, supports 46 of partially-completed object 34 are complete, and the next several layers of first solidifiable material 28 will be used to form first object region 40. However, the same layers of the first solidifiable material 28 will be used to form support sections 42 and 44 of first and second partially-completed objects 30 and 32.

Figure 2B:
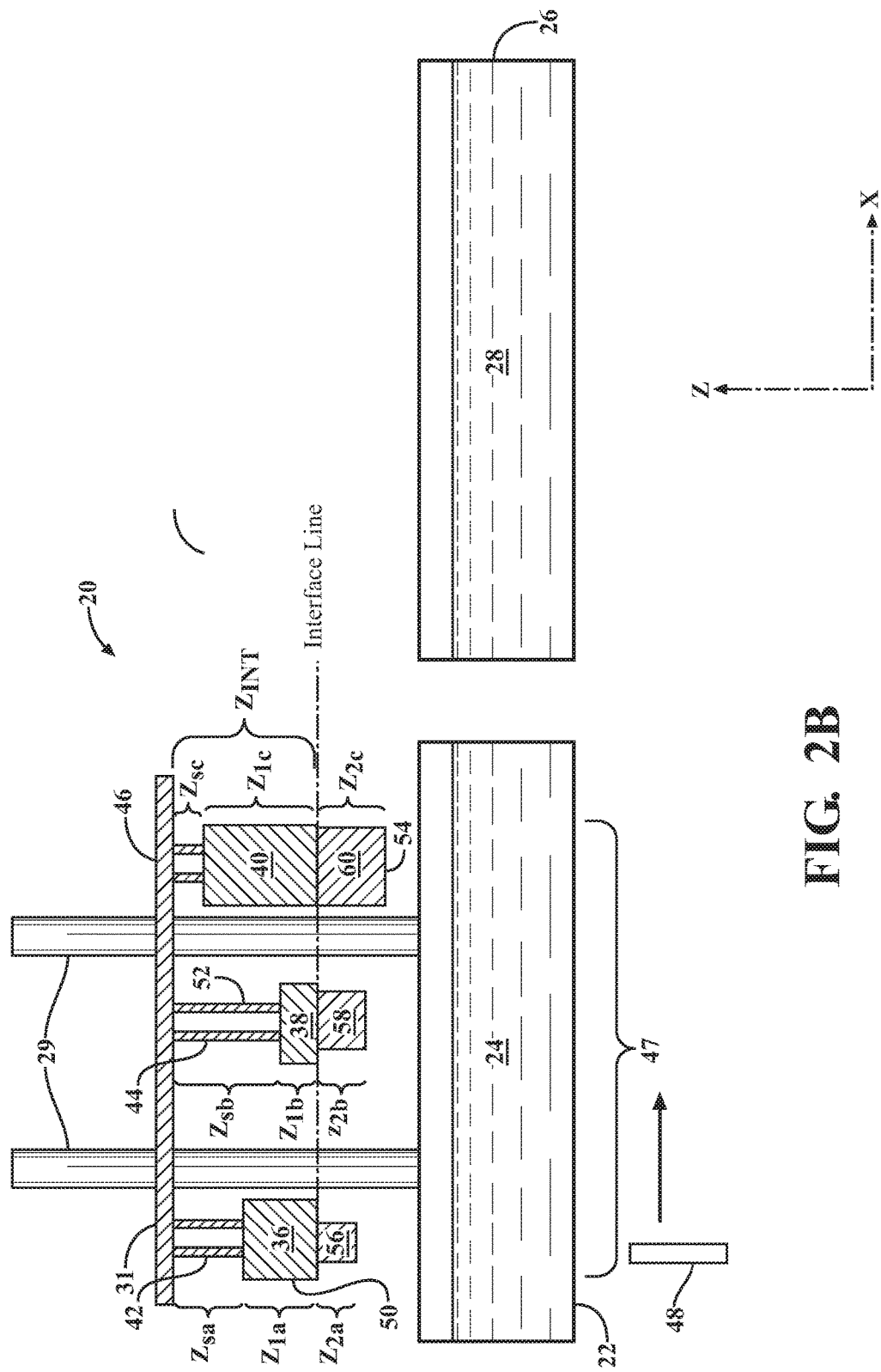
FIG. 2B is a schematic view of the apparatus of FIG. 2A in a second configuration.

Once the partially-completed objects 30, 32, and 34 of FIGS. 2A are formed, the build platform 31 and second solidifiable object material container 22 move relative to one another along the travel (x) axis to align the build platform 31 with the second solidifiable object material container 22. The second object sections 56, 58, and 60 (FIG. 2B) are then built by lowering the first object sections 36, 38, and 40 into second solidifiable material container 22 and solidifying layers of the second solidifiable material 24 to form second object sections 56, 58, and 60 to yield completed objects 50, 52, and 54 (FIG. 2B). The second object sections 56, 58, and 60 need not have the same build (z) axis heights ($Z_{2a}$, $Z_{2b}$, and $Z_{2c}$) because only the second solidifiable object material 24 is used for the remainder of the build process. Support sections 42, 44, and 46 may be removed to yield finished objects, each comprising respective first and second object sections 36/56, 38/58, and 40/60. As shown in FIG. 2B, the total build (z) axis heights of each object 50, 52, 54 differ from one another as do their respective first object sections 36, 38, and 40 and second object sections 56, 58, and 60.

Examples of different apparatuses for making three-dimensional objects are shown in U.S. Pat. No. 8,801,418, the entirety of which is hereby incorporated by reference. As shown therein, in certain configurations the build platform 31 may be brought into selective alignment with different solidifiable material containers by rotating the build platform around the build (z) axis (see FIGS. 37-39 of U.S. Pat. No. 8,801,418 and related paragraphs) instead of by relative translation of the build platform 31 and containers 26 and 22.

Figure 3A:
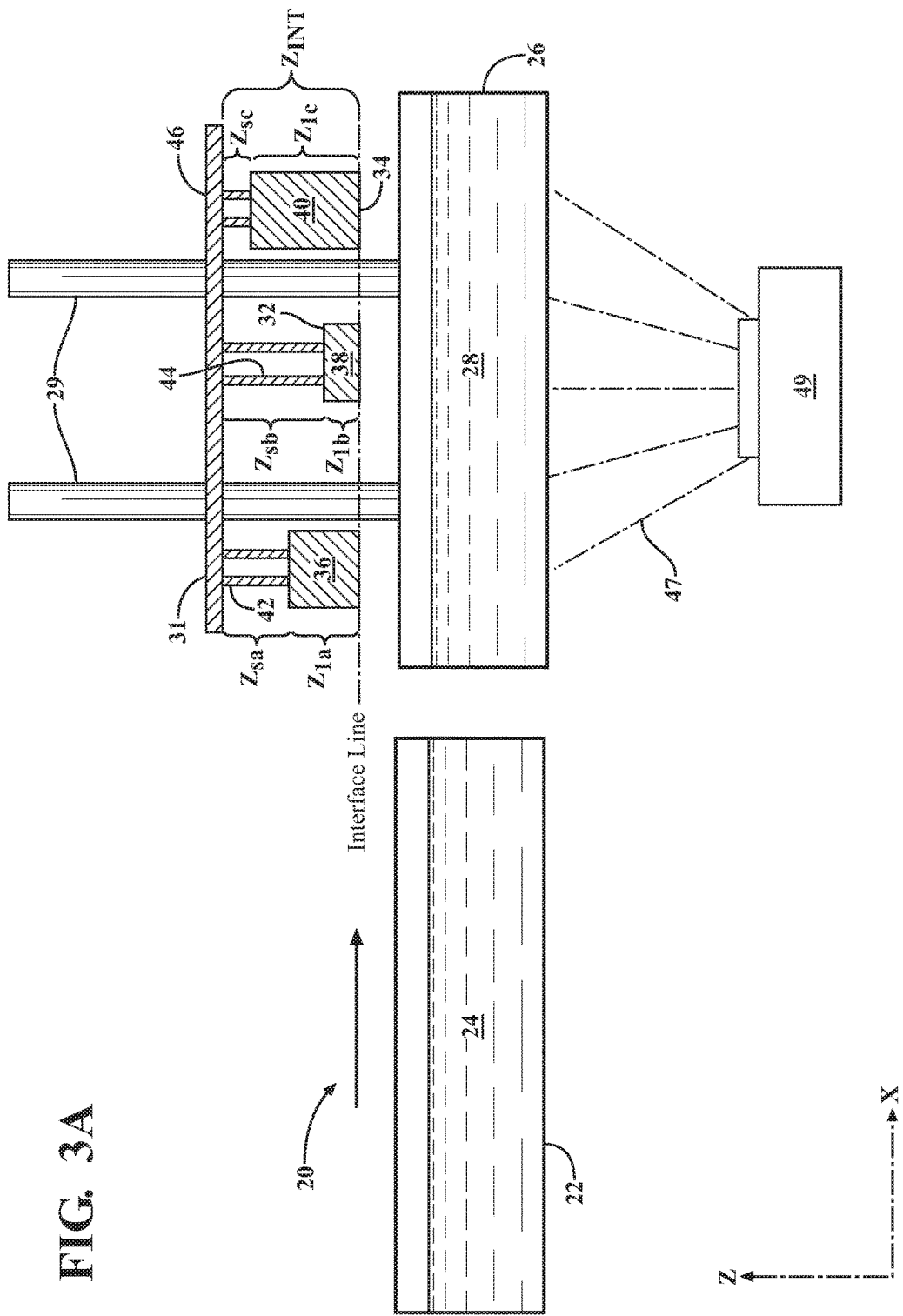
FIG. 3A is a schematic view of a second apparatus for concurrently making multiple units of a three-dimensional object in a first configuration in accordance with the present disclosure.

Referring to FIGS. 3A and 3B, system 20 is configured similarly to the system 20 in FIGS. 2A and 2B. However, instead of using a linear solidification device 48, system 20 of FIGS. 3A and 3B uses a stationary two-dimensional pattern generator 49. The term "two-dimensional pattern generator" refers to the fact that the pattern generator 49 can supply a two-dimensional energy pattern in a single exposure. The two-dimensional pattern generator 49 may be configured in a number of ways. It may provide controlled electromagnetic radiation to provide a desired two-dimensional pattern. The electromagnetic radiation may include actinic light, visible or invisible light, UV-radiation, IR-radiation, electron beam radiation, X-ray radiation, laser radiation, or the like. Moreover, while each type of electromagnetic radiation in the electromagnetic spectrum may be discussed generally, the disclosure is not limited to the specific examples provided. Those of skill in the art are aware that variations on the type of electromagnetic radiation and the methods of generating the electromagnetic radiation may be determined based on the needs of the application. In an example wherein pattern generator 49 is a digital light projector, the generated energy pattern corresponds to volumetric pixels or "voxels." Each voxel defines a location in the x, y plane (orthogonal to the build (z) axis) and has a projected energy density associated with it. The projected energy density is a function of both the time and power intensity (e.g., in $J/m^2/sec$ of the energy). The energy density may also be referred to as the "total exposure" for a given x, y location.

A control unit (not shown) supplies image data to pattern generator 49 to drive the pattern generation process and create the particular pattern defined by projected energy pattern. The supplied image data may include voxel data that includes an intensity for each pixel in the x, y plane, slice-data files, or bitmaps that are derived from slice-data files. Typical file types used to generate bitmaps include STL (Stereo Lithography) files or other CAD (Computer Aided Drafting) files commonly translated for rapid prototyping systems into formats such as SLC, CLI slice data files or voxelized data files which may include data formats such as BMP, PNG, etc. However, any data input type may be used and converted internally to create the image data used by the pattern generator 49. The image data corresponds to an energy pattern and may be generated by a control unit, by pattern generator 49, or by an external source or device (e.g., a network or storage device). The image data may also be modified to a format suitable for pattern generator 49 (e.g., modification of a compressed file such as a TIFF file using CCIT type 4 compression into a standard bitmap). In general, the image data may be define bi-tonal (e.g. "ON/OFF") bitmap images, "grayscale" (e.g., pixel data with variable energy intensities and/or exposure times associated with each pixel), color, or color with intensity and/or exposure time information. Other pattern formats may be available for use such as JPEG, DXF, BMP, PNG, SVG, etc., or other vector or pixel-defined image files (which may be based on industry standards or custom file types).

Referring to FIG. 3A, regions (in the x-y plane) of successive layers of the first solidifiable object material 28 are solidified to concurrently form layers of the support sections 42, 44, 46 and/or first object sections 36, 38, and 40. Each layer solidification operation is defined by a bitmap or a voxel matrix that dictates the intensity of solidification energy transmitted from the pattern generator 49 to the first solidifiable object material 28. The pattern generator 49 may solidify each layer in a single exposure or multiple exposures. However, the portions of each partially-completed object 30, 32, 34 at a given build (z) axis height from the build platform 31 will be concurrently solidified. In a given layer of first solidifiable object material 28, the first object section 36, 38, 40 of some objects may be solidified while the support section 42, 44, and 46 of other objects may be solidified. For example, once height $Z_{sc}$ is reached, supports 46 of object 54 are complete, and the next several layers of first solidifiable material 28 will be used to form first object region 40. However, the same layers of the first solidifiable material 28 will be used to form support sections 42 and 44. When the solidifiable materials are switched, the solidifiable material container 22 or 26 with the desired materials 24 or 28 is moved relative to the pattern generator 49 to place the container 22 or 26 in alignment with the pattern generator 49 and build platform.

In some implementations, and as shown in U.S. Pat. No. 8,801,418, a cleaning station is provided to facilitate the removal of one solidifiable material from the object or removable object supports prior to the application of another solidifiable material. In additional implementations, the system includes a build platform and a pattern generator which remain in fixed alignment with one another in a plane perpendicular to the axis (the "build axis") along which the build platform moves during an object building operation. In other implementations, the object build platform and one or more pattern generators move relative to one another.

Suitable structures for solidifiable material containers 26 and 22 are described in U.S. Pat. No. 8,801,418. In one example, first solidifiable material container 26 and second solidifiable material container 22 comprise a rigid or semi-rigid transparent solidification substrate as a container bottom. One example of a rigid or semi-rigid solidification substrate is a transparent and/or translucent float glass. Another example is a transparent plastic. A variety of different float glasses and plastics may be used. Exemplary plastics that may be used include transparent acrylic plastics supplied by Evonik under the name Acrylite®. The substrate is preferably rigid enough to provide a substantially planar exposed surface of the object solidification material 24 or 28 when an energy pattern is projected onto the exposed surface of the object solidification material 24 or 28. The term "transparent" is meant to indicate that substrate is capable of transmitting the light wavelengths (including non-visible light such as UV light) necessary to solidify first and second object solidifiable materials 26, 24 and that the intensity of such wavelengths is not significantly altered as the light passes through the substrate. The solidifiable material containers 26, 22 may be tiltable relative to an object build platform 31 and an object section formed thereon to facilitate peeling of solidified material from the rigid or semi-rigid transparent and/or translucent solidification substrate the defines the bottom of the container 26, 22.

The solidification substrates defining the bottoms of first and second solidifiable object material containers 22 and 26 are generally rigid or semi-rigid and substantially permeable to the energy supplied by linear solidification device 48 or two-dimensional pattern generator 49. In certain examples, it is preferred that the solidification energy can pass through solidification substrates without a significant diminution in transmitted energy or a significant alteration of the energy spectrum transmitted to the first and second solidifiable object material 28 or 24 relative to the spectrum of the radiation that is incident to substrate surfaces.

In certain embodiments, the first or second solidifiable object materials 28, 24 may adhere strongly to the corresponding rigid or semi-rigid transparent solidification substrate defining the bottom of corresponding solidifiable object material containers 26, 22 causing the object to break or deform when build platform 31 moves away from the linear solidification device 48 or the pattern generator 49 along the build (z) axis during a build process. Thus, in certain examples, a solidification substrate assembly comprising both a rigid or semi-rigid transparent and/or translucent solidification substrate and one or more films is provided. See, FIG. 8 of U.S. Pat. No. 8,801,418. In some examples, the film is resilient, while in others a resilient film is not required. Suitable resilient films include silicone elastomers. One particular example of a suitable silicone elastomer is Elastosil® RT 601, which is supplied by Wacker Silicones. Elastosil° RT 601 is a transparent, addition-curing silicone rubber having greater than 88 percent transmission of light in the 325-700 nm range (for a 10 mm layer). The material has an elongation at break of about 100 percent (ISO 37), and a tensile strength of about 7.0 N/mm2 (DIN ISO 37)tear strength (ASTM D 624B) of about 3.0 N/mm$^2$. Suitable non-resilient films include homopolymers or copolymers formed from ethylenically unsaturated, halogenated monomers, such as Fluoropolymers. Examples of suitable non-resilient films include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA). Other suitable films include PVDF films sold under the Kynar® name by Arkema, ECTFE films sold under the Halar® name by SolvaySolexis, ETFE films sold under the Tefzel° name by DuPont, PFA films sold under the Teflon® -PFA name by DuPont, and MFA films sold under the name Nowofol.

As an alternative, either or both solidifiable material containers 26, 22 may comprise a basin formed from polymeric materials. In one example, a basin comprising a transparent and/or translucent resilient bottom and resilient side walls is used. In certain implementations, both the transparent resilient bottom and the non-resilient side walls are formed from the same or different silicone polymers. In another implementation, a basin comprising non-resilient acrylic side walls and a resilient silicone bottom is used. In another example, the bottom of the basin is defined by a rigid or semi-rigid transparent and/or translucent solidification substrate that is connected to side walls formed of a resilient or plastically deformable polymeric material. In a further example, the substrate may be coated with a resilient transparent material, such as a silicone, that extends only a portion of the way to the side walls, leaving a peripheral gap around the coating and between the coating and the sidewalls. In yet another example, the substrate may be coated with a resilient transparent material that extends all the way to the side walls. In certain examples, a tilting mechanism may be provided that tilts the basin with respect to the build platform 31 to peel solidified solidifiable material from the bottom of the basin. A non-resilient material such as a transparent non-resilient film may also be provided as a layer on top of the resilient bottom between the resilient bottom and the build platform.

In certain methods of making a three-dimensional object from a solidifiable material, the exposed (downward-facing) surface of the partially-completed object 30, 32, 34 (FIGS. 2A and 3A) will be submerged below the upward-facing surface (i.e., the surface facing upward in the build (z) axis direction) of the solidifiable material 28, 24 that is in use at the time. In certain examples, the distance between the exposed surface of object 30, 32, 34, and the bottom of the solidifiable material container 26, 22 (i.e., the solidifiable material layer thickness $\Delta Z$) ranges from about 20 microns to about 80 microns, preferably from about 40 microns to about 60 microns, and more preferably from about 45 microns to about 55 microns. In some examples, the distance from the exposed surface of partially-completed object 30, 32, 34 is the maximum depth of solidification at any point in the x, y plane. In certain examples, the level of solidifiable material 28, 24 in its respective solidifiable material container 26, 22 (i.e., the distance from the upward facing surface of the solidifiable material 28, 24 and the bottom of the corresponding solidifiable material container 26, 22) ranges from about 0.5 mm to about 4 mm, more preferably from about 1mm to about 3 mm, and even more preferably from about 1.5 mm to about 2.5 mm. In those implementations in which the partially-completed object 30, 32, 34 is submerged beneath the upper surface of solidifiable material 28, 24, the solidifiable material 28, 24 may accumulate around the perimeter of the partially-completed object 30, 32, 34. It may be desirable to remove the accumulated solidifiable material 28, 24 before switching materials. Suitable removal techniques are described in U.S. Pat. No. 8,801,418.

In certain examples, support sections 42, 44, and 46 are dissolvable with a water-based solvent (e.g., water or alkali-water solutions) and/or organic-based solvent (e.g., acetone, isopropyl alcohol, etc.). Examples of suitable solvent-dissolvable support materials include water-soluble highly ethoxylated acrylates and methacrylates, water soluble polyethylene glycol acrylates and methacrylates, photopolymers based on hygropscopic acrylated monomers, photopolymers based on acryalted monomers with acid functionality, and alki soluble acrylic resins.

Examples of suitable water-soluble highly ethoxylated acrylates and methacrylates include water-soluble ethoxylated bisphenol A dimethacrylates, ethoxylated bisphenol A diacrylates, and ethoxylated alkyl trialkylates. One example of a suitable ethyoxylated methacrylate is SR 9036A, an ethyoxylated bisphenol A dimethacrylate which is supplied by Sartomer and which includes 30 moles of ethoxy functionality per mole of the compound. An example of a suitable ethoxylated diacrylate is CD 9038, an ethoxylated bisphenol A diacrylate which is supplied by Sartomer and which includes 30 moles of ethoxy functionality per mole of the compound. An example of a suitable ethyoxylated alkyl trialkylate is SR 415, an ethoxylated trimethylpropane triacrylate supplied by Sartomer and comprising 20 moles of ethoxy functionality per mole of compound. Another example of a suitable ethoxylated alkyl trialkylate is SR 9035, an ethoxylated trimethylpropane triacrylate with 15 moles of ethoxy functionality per mole of compound.

Suitable water-soluble photopolymers based on hygroscopic acrylated monomers include those based on SR 256, a 2(2-ethoxyethoxy) ethyl acrylate monomer supplied by Sartomer or N,N-DMA (dimethylacrylamide). Suitable water-soluble photopolymers based on acrylated monomers with acid functionality include those based on β-carboxyethyl acrylate. Suitable water-soluble photopolymers based on alkali soluble acrylic resins include those based on alkali-soluble acrylic resins supplied by Inortech Chimie. Suitable polyethylene glycol acrylates and methacrylates include SR 344, a polyethylene glycol (400) diacrylate supplied by Sartomer, SR 610, a polyethylene glycol (600) diacrylate, supplied by Sartomer, and SR 252, a polyethylene glycol (600) dimethacrylate supplied by Sartomer.

Figure 4:
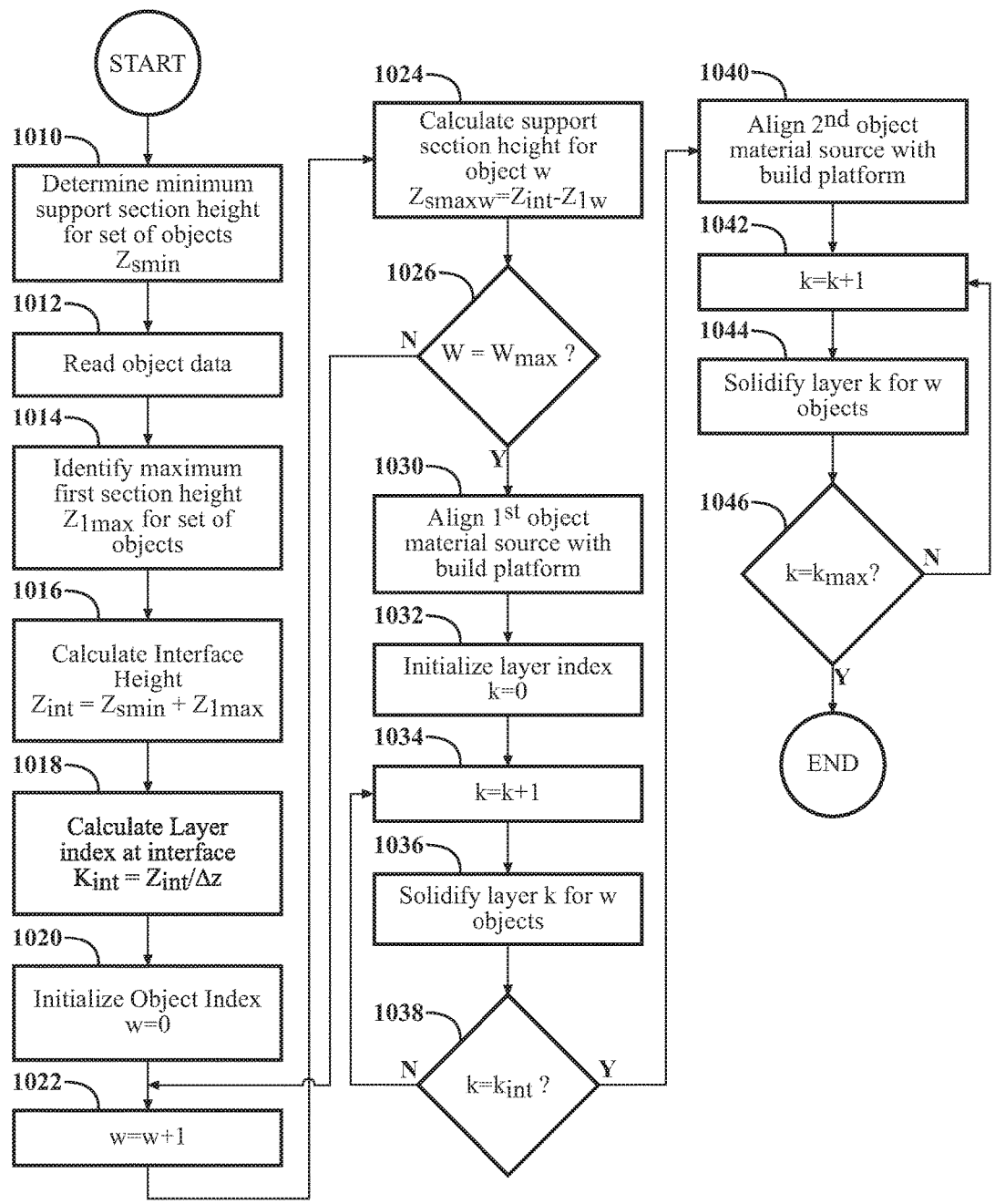
FIG. 4 is a flow chart depicting a method of concurrently making multiple three-dimensional objects in accordance with the present disclosure.

Referring to FIG. 4 a flow chart illustrating a method of concurrently making a plurality of three-dimensional objects from multiple solidifiable materials is provided. The "support section height" of an object that has supports of different heights is the height of the tallest support in the support section. In step 1010 a minimum desired support section height ($Z_{smin}$) along the build (z) axis direction is determined. Each object will have a support section height that is equal to or greater than $Z_{smin}$.

In FIGS. 2A and 2B, $Z_{smin}$ is $Z_{sc}$. Each object will be provided with removable supports having a support section height along the build (z) axis that is no less than the minimum support height $Z_{smin}$. In step 1012 the data that defines each of the three-dimensional objects is read. The data may take a variety of forms, such as slice data, voxel data, CAD data, etc., but it preferably defines the geometry of each object and the locations at which the solidifiable materials used to form the object will change so that the maximum height of a first object section as among the various objects in the plurality of objects may be determined. The "first object section" (e.g., sections 36, 38, and 40 in FIGS. 2A-3B) refers to the section of the object immediately adjacent the removable support section along the build (z) axis and comprises part of the finished object once the supports are removed. In the method of FIG. 4, the removable supports and the first object section are formed by solidifying the same solidifiable material, which is referred to as the "first solidifiable object material," an example of which is material 28 in FIGS. 2A-3B.

Using the object data read in step 1012, in step 1014 the maximum first object section height $Z_{1max}$ along the build (z) axis from among the plurality of three-dimensional objects is determined. For example, in FIGS. 2A and 2B, the maximum first object section height $Z_{1max}$ is $Z_{1c}$. Some objects may have first object sections with different sub-regions, each of which has a different build (z) axis height. As discussed below, $Z_{1max}$ is the maximum first object section height as determined by measuring the height at the sub-region of each object's first object region which is farthest from the build platform.

In step 1016 the interface distance $Z_{int}$ is calculated. The interface distance $Z_{int}$ equals the sum of the minimum support section height $Z_{smin}$ and the maximum first object section height $Z_{1max}$. Thus, the interface distance will never be less than the maximum first object section height for the entire set of objects. In the method of FIG. 4, the interface between the first and second solidifiable object materials is preferably substantially planar. Otherwise, even within a single object, multiple materials switching operations will be required. The straight interface line in FIGS. 2A and 2B indicates that the object 50, 52, 54 interfaces between materials 28 and 24 are substantially planar. Each object will be designed so that the interface distances of all the objects equal $Z_{int}$.

A layer index value $k_{int}$ at the interface is calculated using interface distance $Z_{INT}$ and the solidifiable material layer thickness $\Delta z$ used to form each layer in accordance with the following equation (step 1018):

$$k_{int} = Z_{INT}/\Delta z \tag{2}$$

wherein, $k_{int}$ is a dimensionless layer index;
$Z_{INT}$ is the height (mm) of the build interface along the build axis as measured from the build platform; and
$\Delta z$ is the thickness (mm) of solidifiable material used to form each layer.

The layer index k is an integer that uniquely identifies each layer of the object. For objects built using pattern generators such as DLPs or spatial light modulators, the layer index k will also correspond to a bitmap or row of a voxel matrix. For those objects built using a linear solidification device, the layer index k will correspond to a set of data strings, wherein each data string defines a scan line in the build envelope. The interface layer index value $k_{int}$ is used to determine when to switch materials, such as by bringing the build platform 31 into alignment with second solidifiable object material container 22.

In step 1020 an object index w is initialized to begin the process of calculating the maximum support height $Z_{smaxw}$ for each object. If an object's supports are all the same height, then each support will equal the maximum support section height $Z_{smaxw}$. Otherwise, $Z_{smaxw}$ will equal the height of the tallest support in a given object's support section. In step 1022 the object index is incremented by one.

In the method of FIG. 4 because the removable supports and the first object section are made from the same solidifiable material, the support heights ($Z_{sa}$, $Z_{sb}$, $Z_{sc}$) of the various objects may be adjusted so that they all have the same interface distance $Z_{int}$, as shown in FIG. 2A-3B. In step 1024, each object's support section height is calculated by subtracting its first object section height (i.e., the height of the region of the first object section that is farthest from the build platform 31) from the interface distance:

$$Z_{smaxw} = Z_{int} - Z_{1W} \quad (3)$$

wherein, $Z_{smaxw}$ is the support section height, which is the maximum height of any of the $w^{th}$ object's supports along the build (z) axis from the build platform;
$Z_{int}$ is the interface distance (mm) from the build platform for all objects;
$Z_{1W}$ is the first object section height of the $w^{th}$ object.

Step 1026 evaluates whether the maximum support height for the final object has been calculated by determining whether the current value of the object index w equals the maximum value $W_{max}$. If the maximum value has not been reached, control transfers to step 1022 and the object index w is again incremented. Otherwise, control transfers to step 1030. In step 1030 the source of the first object material (e.g., container 26 in FIGS. 2A-3B) is aligned with build platform 31 such that when viewed from above along the build (z) axis, the build platform is within the x-y area of the container 26. In step 1032 the layer index k is initialized. The layer index k is then incremented in step 1034. In step 1036 layer k is solidified for the w objects being built. In other words, specific x-y regions of the current (in use) solidifiable material's layer thickness Δz are solidified to form the kth layer of each object. The kth layer may be part of a support or part of the first object section. In step 1038 a determination is made as to whether the interface index value $k_{int}$ has yet been reached. If it has not, control transfers to step 1034 and another layer of each object is solidified using the first solidifiable object material 28 in container 26. Otherwise, control transfers to step 1040. In step 1040 a material switching event occurs in which the build platform 31 is brought into alignment with the second solidifiable object material container 22 so that when viewed from above, build platform 31 lies within the same x-y region as the second solidifiable object material container 22. In step 1042 the layer index is again incremented, and the kth layer of each object is solidified in step 1044. The kth layer in step 1042 will be part of the second object section. It should be noted that some objects may have different second object section heights ($Z_{2a}$, $Z_{2b}$, and $Z_2$, in FIGS. 2B and 3B) so at some point, certain objects may continue to be built from the second solidifiable object material 24 while others may already be completed. Also, in step 1036 at certain points some of the objects may be undergoing removable support formation while other objects may be undergoing first object section formation.

In step 1046 it is determined whether the final layer index value $k_{max}$ for the entire set of objects has been reached. If so, the set of objects has been built, and the method ends. Otherwise, control transfers to step 1042 and the layer index is again incremented so that another layer may be solidified.

Thus, by manipulating their removable support section lengths, the method of FIG. 4 allows multiple objects to be concurrently manufactured from two solidifiable object materials using only one material switching event even though the objects may have different first object section heights along the build axis.

The "minimum support section height" in step 1010 is not necessarily determined by any one type of support criteria. It is simply the minimum support section height, as determined by any suitable criteria, which will be used as among the objects in the plurality of objects. It may well exceed the minimum support section height required to provide adequate support to any of the objects. Also, within one object, a support section may include multiple supports of the same or different lengths. The minimum support section height for a set of three-dimensional objects is the smallest height from among the set of heights comprising each object's tallest support height. The object with the largest first object section height (at that object's first object section x, y location where the tallest supports are required) along the build (z) axis is provided with a support section of the minimum support section height. The minimum support section height and the maximum first object section height then fix the position of the interface between the first and second solidifiable object materials (step 1016).

Figure 5:
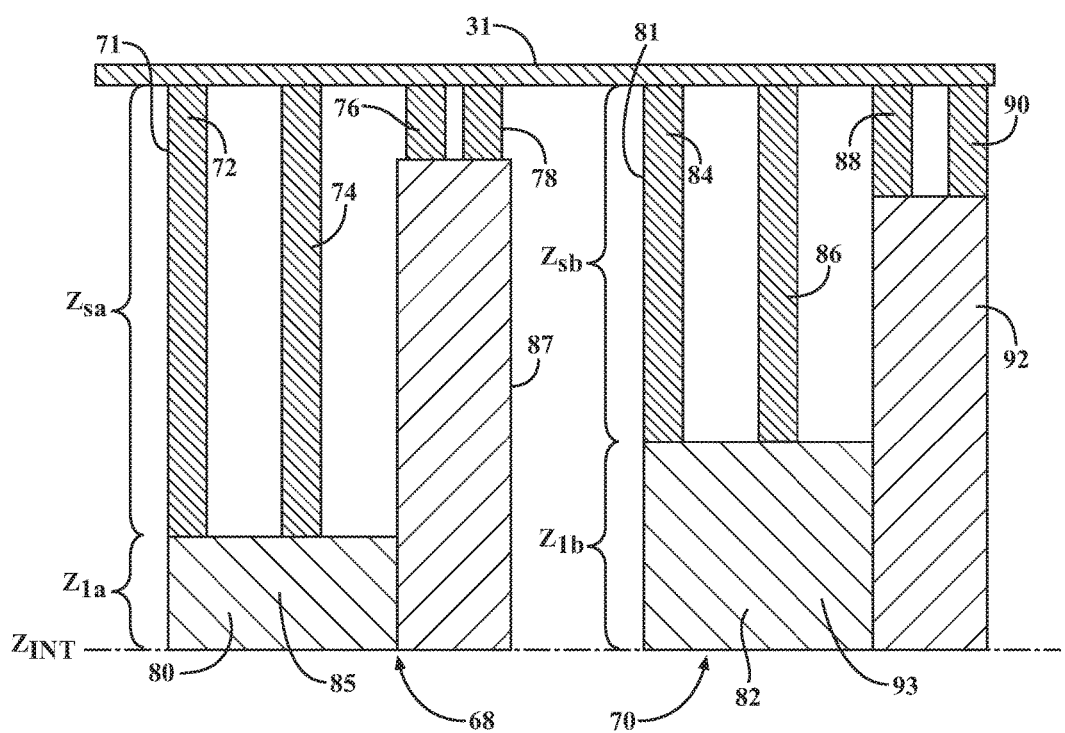
FIG. 5 depicts two similar objects with varying support heights used to illustrate calculating a desired common interface distance along the build axis for a set of three-dimensional objects.

For example, referring to FIG. 5, two partially-completed, objects 68 and 70 formed from a first solidifiable object material are shown suspended from build platform 31. The objects are shown prior to the solidification of a second solidifiable object material to form a second object section. Object 68 has a support section 71 comprising removable supports 72, 74, 76, and 78, each of which are attached at one end to the build platform 31 and at another end to first object section 81. Supports 72 and 74 are taller (i.e., have a greater height along the build (z) axis) than are supports 76 and 78. First object section 80 comprises a first sub-region 85 and a second sub-region 87.

Object 70 has a support section 81 comprising supports 84, 86, 88, and 90, each of which are attached at one end to build platform 31 and at another end to first object section 82. First object section 82 comprises first sub-region 93 and second sub-region 92.

For purposes of carrying out step 1010, a minimum support section height of $Z_{sb}$ is selected by any suitable criteria. Object 70 will require a smaller support section height than object 68 because the sub-region of first object section 82 that is spaced furthest from build platform 31 (i.e., sub-region 93) is closer to build platform 31 than the sub-region of first object section 80 that is spaced furthest from build platform 31. Thus, second object 70 will use supports having the minimum support section height $Z_{smin}$, which in this example equals $Z_{sb}$. The sub-region 93 of second object 70 is the region of second object 70 requiring the shortest supports. Thus, sub-region 93 defines the maximum first object section height $Z_{1b}$ (step 1014). Put differently, the maximum first object section height $Z_{1max}$ in step 1014 is the tallest height (as among the plurality of objects) of the sub-region of the first-object section that is farthest from the build platform 31. Thus, for objects 68 and 70, sub-regions 85 and 93 are the sub-regions of the first object sections 80 and 82 which are farthest from the build platform 31 along the build z) axis. However, sub-region 93 has the larger first object section height $Z_{1b}$. Thus, $Z_{1b}$ is the "maximum first section height" within the meaning of step 1014 of FIG. 4.

In step 1016, the maximum first object section height $Z_{1b}$ and the minimum support section height $Z_{sb}$ are summed to obtain the desired interface distance from the build platform $Z_{INT}$. The support sections of each object are then given the required height to assure that all objects in the build are constructed such that their first object sections end at the same interface position along the build (z) axis. This required height determination is carried out in step 1024.

For the remaining object 68, the sub-region of the first object section 71 that requires the tallest supports will determine the support section height. In object 68 sub-region 85 requires the tallest support section height and has a first object section height of $Z_{1a}$. Therefore, the support section height is calculated as shown in step 1024 and defines the height of the supports 72, 74, 76, and 78 comprising first support section 71.

As an alternative means of carrying out method 4, each object in the plurality of objects may be positioned so that they are all spaced apart from the build platform 31 by at least a specified minimum distance and so that their first and second solidifiable object material interfaces are at the same build (z) axis position relative to the build platform 31 (i.e., so their lower-most surfaces are all spaced apart from the build platform by a common interface distance $Z_{int}$. The support lengths for each surface facing the build platform 31 will then be fixed and may be calculated. The first and second object sections and supports are then formed as described previously.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method of concurrently making a plurality of three-dimensional objects on a build platform, each object comprising a support section formed from a first solidifiable object material, a first object section formed from the first solidifiable object material, and a second object section formed from a second solidifiable object material, wherein the first object section and the second object section of each object have respective heights along a build axis and meet at an interface, the method comprising:
   determining a height of the first object section of each object along the build axis;
   determining a desired interface distance between each object's interface and a build platform along the build axis, wherein the desired interface distance is the same for each object;
   determining a support section height along the build axis for each object, wherein the support section height of each object equals the difference between the desired interface distance and the object's first object section height along the build axis;
   solidifying each object's support section by solidifying a plurality of support layers of the first solidifiable object material until the object's support section height is reached, wherein each plurality of layers is removably adhered to the build platform;
   solidifying each object's first object section by solidifying a plurality of first object section layers of the first solidifiable material until the object's first section height is reached, wherein at least some of the objects in the plurality of three-dimensional objects have different first object section heights;
   solidifying each object's second object section by solidifying a plurality of second object section layers of the second solidifiable object material until the second section height is reached.

2. The method of claim 1, wherein the step of solidifying each object's support section comprises contacting the build platform with the first solidifiable object material and solidifying a plurality of support section first layers on the build platform, wherein each support section first layer corresponds to one of the plurality of three dimensional objects.

3. The method of claim 1, wherein following the step of solidifying each object's first section, a plurality of partially formed objects is present on the build platform, each partially formed object corresponds to one of the plurality of three-dimensional objects, has an exposed surface comprised of solidified first solidifiable object material, and has an overall height relative to the build platform equal to the interface distance, the method further comprising contacting each exposed surface of each partially formed object with the second solidifiable object material and solidifying a first layer of the second solidifiable object material concurrently in contact with the exposed surface of each partially formed object.

4. The method of claim 1, wherein the steps of solidifying each object's support section and solidifying each object's first object section collectively comprise supplying solidification energy to a plurality of layers of the first solidifiable object material in accordance with a first plurality of solidification energy patterns, and each solidification energy pattern in the first plurality of solidification energy patterns corresponds to one of the layers of the first solidifiable object material and corresponds to the support section or the first object section of each of the plurality of three-dimensional objects.

5. The method of claim 4, wherein each solidification energy pattern is defined by a bitmap.

6. The method of claim 4, wherein each solidification energy pattern is defined by a row of a voxel matrix.

7. The method of claim 4, wherein each solidification energy pattern is defined by a set of data strings.

8. The method of claim 4, wherein the step of solidifying each object's second section comprises solidifying a second plurality of layers of the second solidifiable object material in accordance with a second plurality of solidification energy patterns, and each solidification energy pattern in the second plurality of solidification energy patterns corresponds one of the layers of the second solidifiable object material and corresponds to the second object section of at least some of the plurality of three-dimensional objects.

9. The method of claim 1, further comprising placing a source of the first solidifiable object material in alignment with a projection area of a source of solidification energy.

10. The method of claim 9, wherein the source of solidification energy is a digital light projector.

11. The method of claim 9, further comprising placing a source of the second solidifiable object material in alignment with a projection area of a source of solidification energy after the step of solidifying each object's first section.

12. The method of claim 11, wherein the source of solidification energy is a laser diode, the laser diode is in optical communication with a rotating polygonal mirror, and the laser diode and the rotatable polygonal mirror define a first linear solidification device.

13. The method of claim 1, further comprising placing the build platform in alignment with a source of the first solidifiable object material.

14. The method of claim 13, further comprising placing the build platform in alignment with a source of the second solidifiable object material after the step of solidifying each object's first object section.

\* \* \* \* \*